US006901471B2

(12) United States Patent
Govindaraman (10) Patent No.: US 6,901,471 B2
(45) Date of Patent: May 31, 2005

(54) TRANSCEIVER MACROCELL ARCHITECTURE ALLOWING UPSTREAM AND DOWNSTREAM OPERATION

(75) Inventor: Ravikumar Govindaraman, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 457 days.

(21) Appl. No.: 09/797,471

(22) Filed: Mar. 1, 2001

(65) Prior Publication Data

US 2004/0225808 A1 Nov. 11, 2004

(51) Int. Cl.⁷ ............................ G06F 13/38; G06F 13/40
(52) U.S. Cl. ................... 710/305; 710/313; 710/314; 710/315; 710/105
(58) Field of Search ........................... 710/305–317, 710/104–106, 8–12, 14–17, 58–61, 33, 35

(56) References Cited

U.S. PATENT DOCUMENTS

| | | | | | |
|---|---|---|---|---|---|
| 5,768,630 | A | * | 6/1998 | Kim ............................ | 710/72 |
| 6,040,792 | A | * | 3/2000 | Watson et al. ............... | 341/100 |
| 6,191,713 | B1 | * | 2/2001 | Ellis et al. ................... | 341/100 |
| 6,230,226 | B1 | * | 5/2001 | Hu et al. ..................... | 710/305 |
| 6,272,644 | B1 | * | 8/2001 | Urade et al. ................. | 713/320 |
| 6,295,563 | B1 | * | 9/2001 | Whittaker .................... | 710/52 |
| 6,434,644 | B1 | * | 8/2002 | Young et al. ................. | 710/63 |
| 6,445,624 | B1 | * | 9/2002 | Janzen et al. ................ | 365/191 |
| 6,523,081 | B1 | * | 2/2003 | Karlsson et al. ............ | 710/305 |
| 6,618,788 | B1 | * | 9/2003 | Jacobs ........................ | 710/315 |
| 6,718,423 | B2 | * | 4/2004 | Zolnowsky .................. | 710/313 |
| 6,732,204 | B2 | * | 5/2004 | Ishida ......................... | 710/71 |
| 6,775,733 | B2 | * | 8/2004 | Chang et al. ................ | 710/313 |
| 6,791,950 | B2 | * | 9/2004 | Wu ............................. | 370/257 |
| 6,795,949 | B2 | * | 9/2004 | Hanson et al. ................ | 716/1 |
| 2001/0017846 | A1 | * | 8/2001 | Wu | |
| 2002/0116565 | A1 | * | 8/2002 | Wang et al. | |

OTHER PUBLICATIONS

USB 2.0 Transceiver and Macrocell Tester (T&MT) Interface Specification Version 1.2 Apr. 4, 2001 Copyright 2000 Intel Corp.*
USB 2.0 Transceiver Macrocell interface (UTMI) Specification Version 1.05 Mar. 29, 2001 Copyright 1999–2001 Intel Corp.*
"USB 2.0 Transceiver Macrocell Interface (UTMI) Specification", Version 1.03, Aug. 4, 2000.*

* cited by examiner

*Primary Examiner*—Paul R. Myers
*Assistant Examiner*—Raymond N Phan
(74) *Attorney, Agent, or Firm*—Bever, Hoffman & Harms LLP; Jeanette S. Harms (57) ABSTRACT

A system wherein a signal over a Universal Serial Bus (USB) interface is received by a receiver component. A mixed signal block utilizes a mixed signal interface to transmit the signal to a processor block.

4 Claims, 6 Drawing Sheets

TRANSCEIVER MACROCELL ARCHITECTURE ALLOWING UPSTREAM AND DOWNSTREAM OPERATION

BACKGROUND

This invention relates generally to Universal Serial Bus (USB) compliant devices and more particularly to USB transceiver macrocells. Transceiver macrocells are used in Universal Serial Bus (USB) compliant systems to connect device controllers to host systems. Unfortunately, conventional transceiver macrocells are only employable to connect devices to upstream ports. Developers must use different transceiver devices to connect devices to downstream ports. Having to use distinct devices is burdensome to developers and manufacturers of USB systems. Accordingly, there is a need for a macrocell capable of both upstream and downstream operation.

BRIEF DESCRIPTION OF THE DRAWINGS

These and other features and advantages of one example of the invention will become apparent from the following detailed description the accompanying drawings and the claims.

DETAILED DESCRIPTION

Pursuant to one example of the invention, a reusable transceiver macrocell is provided.

The invention in one example encompasses a method. A signal over a Universal Serial Bus (USB) interface is received. A mixed signal interface is utilized to transmit the signal through a processor block.

Another example of the invention encompasses a method. A signal is received over a mixed signal interface. The signal is transmitted to a processor block over a Universal Serial Bus interface.

In another example, the invention comprises a system. A signal over a Universal Serial Bus (USB) interface is received by a receiver component. A mixed signal block utilizes a mixed signal interface to transmit the signal to a processor block.

In a further example the invention comprises a system. The system comprises a mixed signal interface. A mixed signal block receives a signal over the mixed signal interface. The signal is transmitted by a transmitter component to a processor block over a Universal Serial Bus interface.

Figure 1:
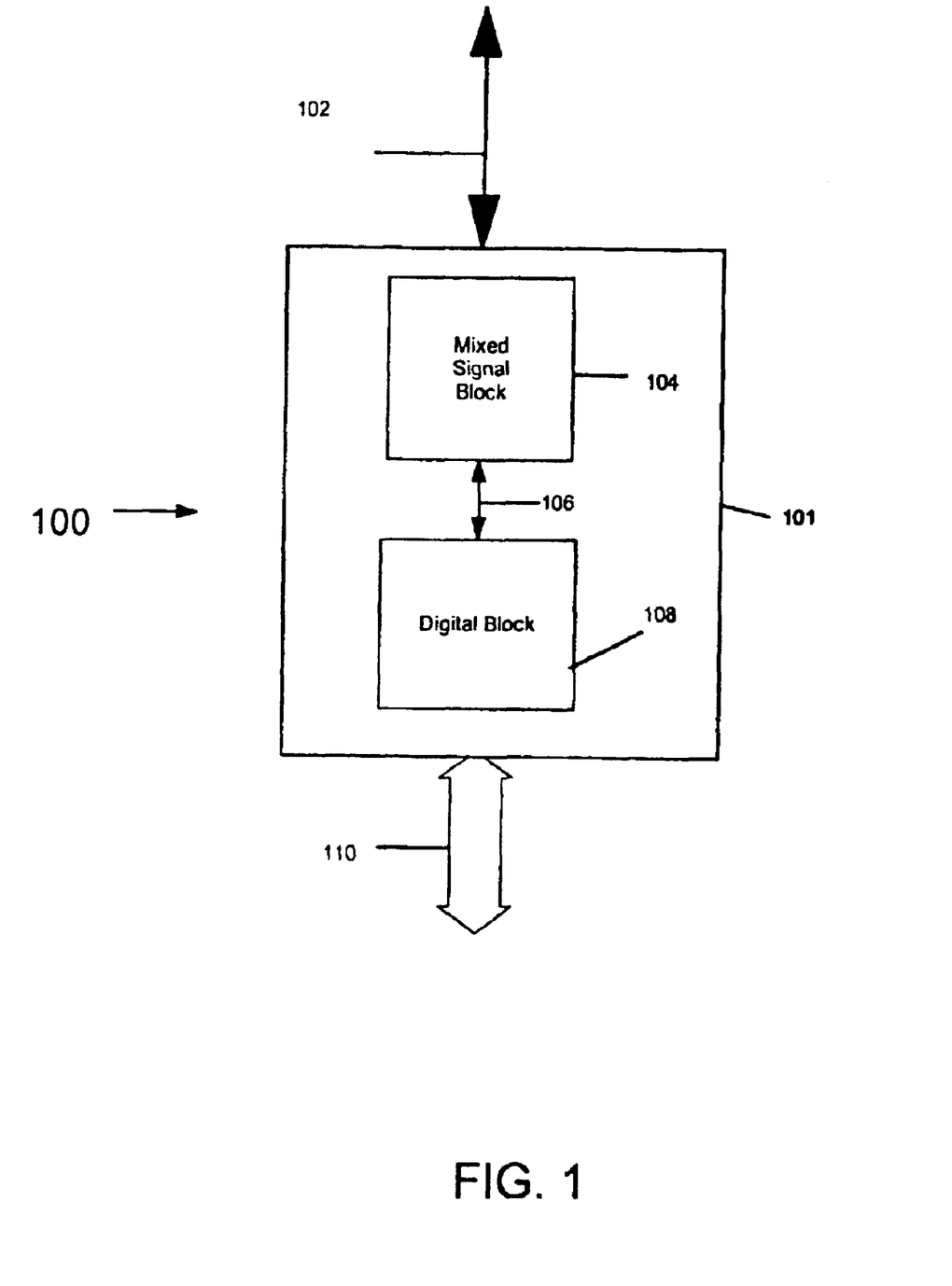
FIG. 1 is a functional block diagram of one example of a macrocell.

Referring to FIG. 1, system 100, in one example, comprises a macrocell 101. Macrocell in one example comprises a Universal Transceiver Macrocell Interface (UTMI) macrocell, such as the USB2 PHY manufactured by inSilicon Corporation of San Jose, Calif. Macrocell in one example is compliant with both the Universal Serial Bus (USB) 2.0 specification, the USB 2.0 UTMI Specification, and the Enhanced Host Controller Interface (EHCI) which are hereby incorporated by reference, and can be obtained from the USB Inventor's Forum, Inc. (USB-IF) of Portland, Oreg.

Macrocell 101 in one example comprises interface 102, mixed signal block 104, mixed signal interface 106, digital bock 108, and interface 110. A general description of the components of macrocell 101 now follows with a more detailed description being provided with respect to FIG. 2.

Interface 102 in one example comprises a USB interface. An example of a USB interface is a USB 2.0 interface. A USB 2.0 interface has three operational modes: A high speed (HS) operational mode having a signaling bit rate of 480 megabits per second (Mbps), a full speed (FS) operational mode having a signaling bit rate of 12 Mbps, and a low speed (LS) operational mode having a signaling bit rate of 1.5 Mbps.

Depending on the implementation of macrocell 101, interface 102 can be connected either to a host device or a peripheral device. For instance, if macrocell 101 were implemented as part of a host device, interface 102 would be connected to a host controller. If macrocell 101 were implemented in a peripheral device or a hub device, interface 102 would be connected to a hub or device controller. A discussion of these implementations is provided herein.

Mixed signal block 104 contains analog drivers, receivers, high speed clock recovery, and high speed data recovery modules. Mixed signal block 104 is interfaced to digital block 108 through mixed signal interface 106.

Mixed signal interface 106 provides an interface between mixed signal block 104 and digital block 108. Mixed signal interface 106 in one example is an analog mixed signal interface (AMSI). Mixed signal interface 106 is capable of conveying both digital and analog signals. In one example, mixed signal interface 106 provides downstream signals to/from a hub device, as will be described herein. In another example, mixed signal interface 106 provides downstream signals to/from a host/hub/device controller, as will be described herein.

Digital block 108 in one example performs functions such as full speed/low speed data and clock recovery, NRZI coding/decoding, and bit stuffing/unstuffing on signals received from mixed signal block over mixed signal interface 106.

Interface 110 in one example is a Universal Transceiver Macrocell Interface (UTMI). An example of a UTMI is provided in the USB 2.0 UTMI Specification. Interface 110 in one example is a 8-bit 60 MHz parallel interface. In another example interface 110 is a 16 bit 30 MHz parallel interface. In a further example interface is a 48 MHz or 6 MHz interface providing either a 8-bit or 16-bit interface. Interface 110 can be connected to a controller. Depending on the implementation of macrocell 101, the controller could be a host controller, a hub controller, or a device controller. Various implementations are discussed herein.

Macrocell 101 in one example is utilized to connect USB devices to USB networks. For instance, macrocell 101 can be used to connect a peripheral device controller to a USB interface, a host controller to a USB interface, a hub controller to a USB interface, and/or a plurality of hub connected USB peripherals to a USB interface. In each of these implementations, the macrocell 101 is utilized to transfer signals between USB device, such as between a peripheral and host, or between a host and a hub. This signals can include data signals, command signals, or control signals. For example, a USB host will send a command to a printer to begin a print job. Included with the command with be print data. Macrocell 101 assists USB devices by providing a physical layer that is able to perform many necessary functions (e.g., serialization/deserialization, encoding/decoding, transmission/reception etc.) on these signals before, during, and after a given data transaction.

A more detailed description of macrocell 101 is now provided.

Since the basic operation of the components in macrocell 101 are known, conventional components and circuits have been illustrated in the drawings by readily understandable block representations and schematic diagrams, which show only those specific details that are pertinent to the present invention.

Figure 2:
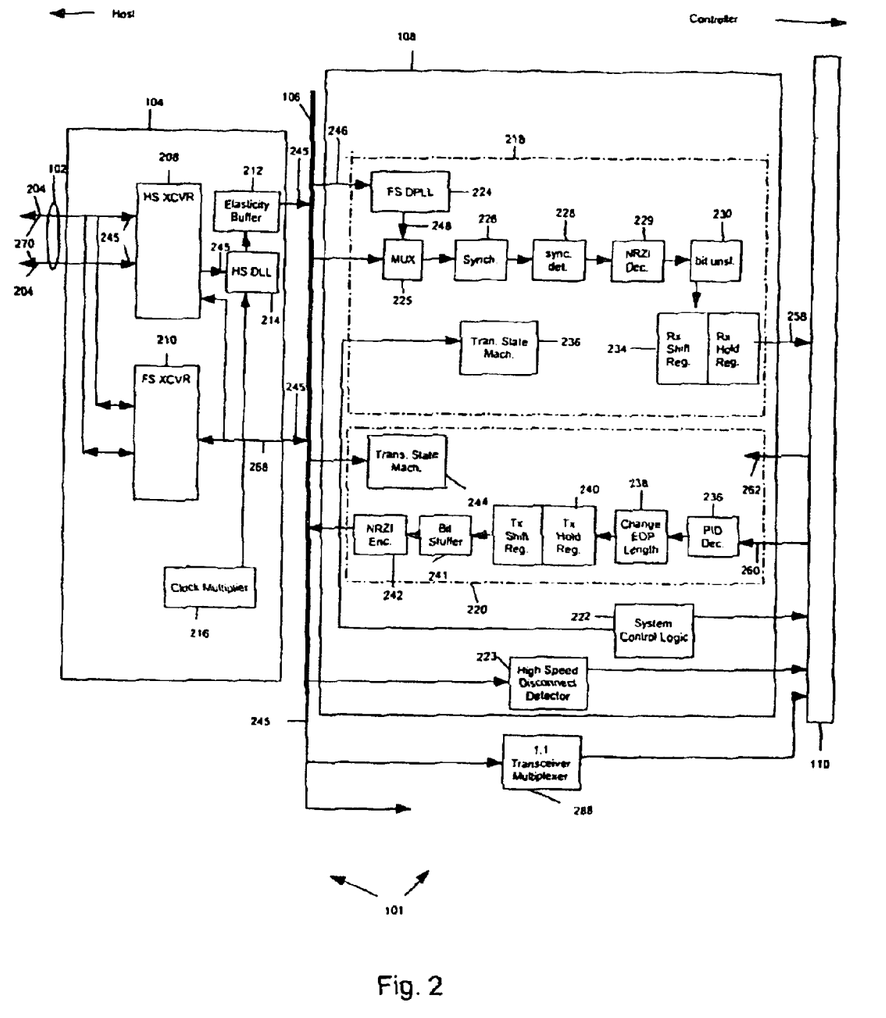
FIG. 2 is functional block diagram including exemplary logic of mixed signal block, digital block, and mixed signal interface of the macrocell of FIG. 1.

Interface 102 in one example comprises an USB interface. Accordingly, macrocell 101 sends and receives serial data signals through differential signal lines 204 of interface 102. In the example of a host implementation of macrocell 101, differential signal lines 204 transmit data to/from a peripheral device. In the example of a peripheral device implementation of macrocell, differential signal lines 204 transmit data to/from a host device. In the example of a hub implementation of macrocell, differential signal lines 204 transmit data to/from a host device.

Mixed signal block 104 comprises high speed transceiver 208, full speed transceiver 210, elasticity buffer 212, high speed delay locked loop (HS DLL) 214, and clock multiplier 216.

High speed transceiver 208 is responsible for the transmission and receipt of high speed (480 Mbps) signals to/from differential signal lines 204. In one example, received data is sent from high speed transceiver 208 to high speed phase locked loop 212.

Full speed transceiver 208 is responsible for the transmission and receipt of full speed (12 Mbps) and low speed (1.5 Mbps) signal to/from differential signal lines 204. In one example, if macrocell 101 is implemented in a peripheral device, full speed transceiver 210 sends/receives low speed or full speed signal to/from digital block 108 for further processing. In another example, if macrocell 101 is implemented in a host device, full speed transceiver 210 sends/receives low speed or full speed signals to/from a host controller over mixed signal interface 106. In still another example, if macrocell 101 is implemented in a hub, full speed transceiver 210 sends/receives low speed or full speed signals to/from a hub repeater over mixed signal interface 106.

Elasticity buffer 212 is the accumulation point for high-speed data before transfer to digital block 108 (macrocell 101 implemented in a peripheral device or host device) or transfer to a hub repeater (for hub implementation). Full speed and low speed data do not pass through elasticity buffer.

HS DLL 214 receives high speed data signals from high speed transceiver 208 and performs clock and data recovery on the signals. HS DLL 212 sends recovered clock and recovered data signals to the elasticity buffer 212.

Clock multiplier 216 generates the appropriate internal clock signals for the components of macrocell 108. In one example, clock multiplier 216 generates the internal clock signals from an external crystal (not shown).

Still referring to FIG. 2, digital block 108 in one example comprises a receive interface 218, a transmit interface 220, control logic 222, and high speed (hs) disconnect detector 223. Receive interface 218 receives signals, originating from interface 102, over mixed signal interface 106. Receive interface 218 also transmits signals through interface 110 to either a host controller, a hub controller, or a device controller, depending on the application of macrocell 101. Transmit interface 220 receives signals over interface 110. These signals could be generated from a host controller, a hub controller, or a device controller, depending on the application of macrocell 101. Transmit interface 220 also transmits signals to mixed signal block 104 over mixed signal interface 106. Control logic 222 accepts control inputs from interface 110 and decodes the inputs to activate transmission and reception controls on mixed signal interface 106. HS disconnect detector 223 determines whether a HS devices have been disconnected from a hub or USB interface, as will be described herein.

Receive interface 218 in one example comprises full speed digital phase locked loop (FS DPLL) 224, multiplexer (MUX) 225, synchronizer 226, sync detector 228, NRZI decoder 229, bit unstuffer 230, receive shift/hold register 234, and receive state machine 236.

FS DPLL 224 operates as an extraction component to extract clock and data information from full speed and low speed signals that are received from mixed signal block 104. When macrocell 108 is in full speed operational mode, FS DPLL runs from a 48 MHz clock. When macrocell 108 is in low speed operational mode, FS DPLL runs from a 6 MHz clock. When macrocell 108 is in high speed operational mode, FS DPLL 224 does not receive signals sent from host device 102.

MUX 225 acts to allow signals to/from both high speed transceiver 208 and full speed transceiver 210 to be routed to receive interface 218. Hence, in high speed operational mode, signals are sent from high speed transceiver 208 through HS DLL 212, elasticity buffer 214, and mixed signal interface 203 to MUX 225. MUX 225 then routes the signals through the remaining components of receive interface 218 for further processing. Similarly, in the full speed or low speed operational modes, the full speed transceiver sends signals through mixed signal interface 203 to FS DPLL 224. FS DPLL 224 then sends signals to MUX 225 which routes the signals through the remaining components of receive interface 218 for further processing.

Synchronizer 226 in one example acts as a synchronizer component to synchronize signals that are received from host 102 to the clock domain of controller 112. In one example, synchronizer 226 synchronizes signals to a 30 MHz clock domain. In another example, synchronizer 226 synchronizes signals to a 60 MHz clock domain. In a further example, synchronizes signals to a 6 MHz clock domain. Synchronizer 226 could be comprised of one or more flip flops coupled together in series.

Sync detector 228 checks for a sync pattern in received signals. Upon detection of a sync pattern, sync detector 228 recognizes the start of a packet ID (PID) field in accordance with either the USB 1.1 or USB 2.0 protocols. The data in the received signal after the sync pattern is passed to the remaining blocks in receive interface 218.

NRZI decoder 229 decodes NRZI coded data from the received signals. NRZI decoder then sends signals to bit unstuffer 230.

Bit unstuffer 230 removes a stuffed "0" bit from received signals and detects bit stuff violations. In order to provide enough transitions for clock recovery, USB data is bit stuffed by inserting a "0" bit whenever a series of six consecutive data ones is encountered.

Receive shift/hold register 234 act as a serial-to-parallel conversion component to convert the serial signals received from host 102 to parallel signals. Receive shift/hold register can transmit either 8 or 16 bit parallel signals to a parallel receive port of interface 110.

Receive state machine 299 receives inputs from sync detector 228, mixed signal block 104, FS DPLL 224, and bit unstuffer 230. Receive state machine 299 generates signals for the parallel receive port of interface 110 to indicate the validity of parallel data.

Transmit interface 220 in one example comprises packet identification (PID) decoder 236, change end of packet (EOP) length block 238, transmit hold/shift register 240, bit stuffer 241, and NRZI encoder 242, and transmit state machine 244.

PID decoder 236 and EOP length block 238 in one example are employed to implement macrocell 101 in host applications. For instance, the USB 2.0 specification directs that a start of frame (SOF) token, or packets, be sent by a host device. The SOF token has a 40-bit end of packet (EOP) field. Other USB 2.0 tokens typically only have 8-bit EOP field. Moreover, the USB specification states that only SOF tokens will only be sent by host devices. Therefore, to implement macrocell 101 in a host device or hub, macrocell 101 must have the ability to receive SOF tokens without violating the USB protocol Accordingly, PID decoder 236 decodes the PID of each token and passes it to the change EOP length block 238. If the token is an SOF token, change EOP length block 238 changes the EOP field to 8-bits. As an alternative, instead of using PID decoder 236 and EOP length block 238, macrocell 101 could employ an additional pin on interface 110 to control the EOP length.

Transmit hold/shift register 240 receives parallel data from synchronizer 240 and acts as a parallel-to-serial conversion component to convert signals received from interface 110 to parallel format. Transmit hold/shift register 240 can convert data from either 8-bit or 16-bit parallel data to a serial format.

Bit stuffer 241 inserts a data "0" after every six consecutive "1"s in the data stream. The inserted "0" forces a transition in the NRZI data stream. The transition is necessary for clock recovery. Bit stuffing is enabled with the sync pattern and is applied throughout transmission of signals.

NRZI encoder 242 encodes the serial signals that are to be transmitted to host device 102. NRZI encoding forces a level transition whenever a data "0" is input. A data "1" results in the previous level being maintained. NRZI encoder 242 transmits data to either high speed transceiver 208 or full speed transceiver 210 over mixed signal interface 106.

Transmit state machine 244 handles the handshake signals at the parallel transmit receive port of interface 110. Transmit state machine 244 in one example controls the transmit path form interface 110 to mixed signal interface 104, and generates control signals to the blocks in transmit component 220 so that required sync PID data and EOP data for the token being transmitted is provided in the data stream.

In one example, 1.1 transceiver multiplexer 288 is selectively added to digital block 108 for host implementations. 1.1 transceiver multiplexer 288 is used to control an extended interface that is selectively added to interface digital block 108 to a host controller, as will be described herein.

An exemplary description of the operation of macrocell 108 in full speed operational mode is now provided.

Referring still to FIG. 2, as was described above, a host device or a peripheral device, depending on the implementation, sends signals 245 to macrocell 101 over interface 102. Macrocell 101 receives signals 245 from interface 102. In one example interface 102 is operating in low speed operational mode and signals 245 have a serial data rate of 1.5 Mbps. In another example interface 102 is operating in full speed operational mode and signals 245 have a data rate of 12 Mbps. In a further example interface 102 is operating in high speed operational mode and signals 245 have a data rate of 480 Mbps.

Mixed signal block 104 receives signals 245 over differential signal lines 204. In high speed operational mode high speed transceiver 208 receives signals 245 and transmits signals 245 through HS DLL 214, elasticity buffer 212, and mixed signal interface 106 to receive interface 218 for processing as described above. In one example, such as a hub implementation, signals 245 are transmitted over mixed signal interface 106 to digital block 108 for processing as described above, and eventually over interface 110 to a hub controller. In addition, signals 245 are also transmitted over mixed signal interface 106 to a hub repeater as will be described herein. In a further example, such as host implementation, signals 245 are transmitted over mixed signal interface 106 to digital block 108 for processing as described above, and eventually over interface 110 to a host controller, such as a USB 2.0 host controller. In a further example, such as a device implementation, signals are transmitted over mixed signal interface to digital block 108 for processing as described above, and eventually over interface 110 to a device controller, such as a USB 2.0 compatible device controller.

In the full speed and low speed operational modes, full speed transceiver 210 receives the signals 245. In the example of a host implementation, full speed transceiver 210 transmits signals 245 directly over mixed signal interface 106 to a host controller, such as a USB 1.1 host controller, as will be described herein.

In the example of a hub implementation, full speed transceiver transmits the full speed or low speed signals 245 over mixed signal interface 106 to receive interface 218 for processing as described above, and eventually over interface 110 to a hub controller. In the hub implementation, full speed or low speed signals 245 are also transmitted directly over mixed signal interface 106 to a hub repeater, as will be described herein.

In high speed operational mode, when signals 245 are sent to digital block 108, MUX 225 receives and information signal 248 (information is extracted in mixed signal block 104) and passes information signal 248 to the other components of receive interface 218 for further processing as described above.

In the full speed operational mode or low speed operational modes, when signals 245 are sent to digital block 108, FS DPLL 224 receives signals 246. FS DPLL 224 extracts information from signals 246 to produce an information signal 248. In one example, information signal 248 has a frequency distinct from the frequency of interface 104. FS DPLL 224 then transmits information signal 248 through MUX 225 to the other components of receive interface 218 for further processing as described above.

In one example, after receiving signals from macrocell 101, a controller (e.g., host controller, hub controller, device controller) sends a response signal 260 over interface 110. In one example, signal 260 is a 30 MHz 16-bit parallel signal. In another example, signal 260 is a 60 MHz 8-bit parallel signal. In a further example, signal 260 is either 8-bit or 16-bit 6 MHz data response signal.

In a host implementation operating in high speed operational mode, response signal 260 is received from a host controller, such as a USB 2.0 host controller, over interface 110 and processed by the components of transmit interface 220 as described above. Transmit interface 220 then transmits signals 268 to mixed signal block 104. High speed transceiver 208 receives signals 268 and transmits signals 270 over interface 102 to a peripheral device.

In a host implementation operating in full speed or low speed operational mode, response signals are transmitted by a host controller, such as a USB 1.1 host controller, directly to full speed transceiver in mixed signal block 104 over an interface, such as an extended UTMI interface, as will be described herein Full speed transceiver 210 then outputs response signals to a peripheral device over interface 102.

In a hub implementation, response signal 260 is received from a hub controller over interface 110. and processed by the components of transmit interface 220 as described above. Transmit interface 220 then transmits signals 268 to mixed signal block 104. In high speed operational mode, high speed transceiver 208 receives signals 268 and transmits signals 270 over interface 102 to a host device. In low speed or full speed operational mode, full speed transceiver 210 receives signals 268 and transmits signals 270 over interface 102 to a host device.

In the hub implementation response signals are also received from a hub repeater over mixed signal interface 106, as will be described herein, and transmitted over interface 102 to a host device.

In a device implementation, response signal 260 is received from a device controller over interface 110 and processed by the components of transmit interface 220 as described above. Transmit interface 220 then transmits signals 268 to mixed signal block 104. In high speed operational mode, high speed transceiver 208 receives signals 268 and transmits signals 270 over interface 102 to a host device. In low speed or full speed operational mode, full speed transceiver 210 receives signals 268 and transmits signals 270 over interface 102 to a host device.

A description of a hub implementation of macrocell 101 is now provided.

Figure 3:
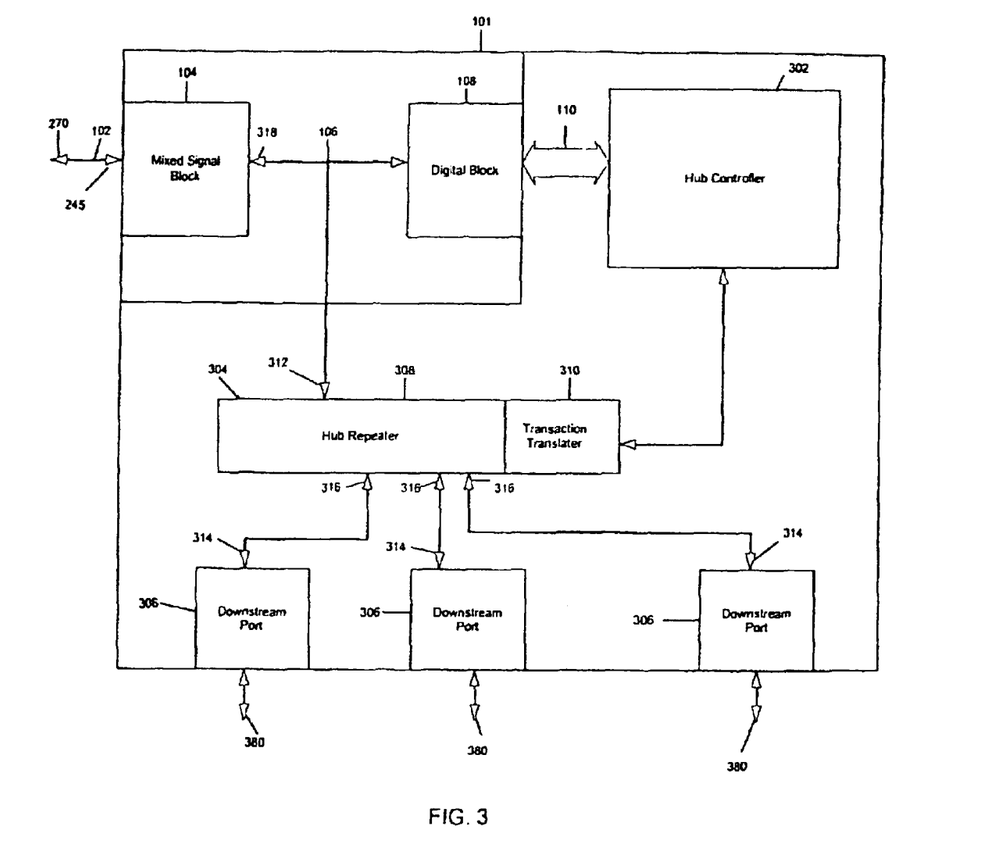
FIG. 3 is a functional block diagram of an example of the macrocell of FIG. 1 being employed in a hub.

Referring to FIG. 3, in one example, a hub 300 comprises macrocell 101, hub controller 302, hub device 304, and a plurality of instances of downstream port 306.

Hub controller 302 controls the operation of hub 302. Examples of functions that hub controller performs are the monitoring and keeping of the status of downstream ports 306, supporting the USB transactions required by USB hubs as defined by the USB 2.0 specification, and coordinating and controlling hub repeater 308.

Hub device 304 in one example comprises a hub repeater 308 and a transaction translator 310. Hub repeater 308 operates to route signals received to/from mixed signal interface 106 to the proper downstream ports.

Both hub repeater 308 and transaction translator 310 operate as defined in the USB 2.0 specification.

Downstream ports 306 are the interface to which peripheral devices are connected to hub 300. In one example, mixed signal block 104 is instantiated in each downstream port.

In operation, signals 245 received from a host device over interface 102 are received by macrocell 101. Mixed signal block 104 and digital block 108 process the signals 245 as provided above.

Mixed signal interface 106 outputs signals 312 to hub repeater 308. The specific composition of signals from mixed signal interface will be describe below with respect to FIG. 6. Hub repeater 308 receives signals 312 from mixed signal interface 106 and determines the downstream port 306 for which the signals 312 are intended (i.e., the peripheral device that host intended to send the signals to). Hub repeater then transmits signals 314 to the mixed signal block of the appropriate downstream port 106. The peripheral device connected to the appropriate downstream port then each receive the signals 314 over interface 380. Interface 380 in one example comprises a USB 2.0 interface.

The peripheral devices also send signals to the host device. In one example, peripheral devices send response signals to the host device. In another example, peripheral devices send data signal, such as from a digital camera, or a scanner to host device. When a peripheral device sends signals to the host device, the peripheral device first sends a signal over interface 280 to a downstream port 306. Downstream port 306 then sends signals 316 to hub repeater 308. Hub repeater 308 then sends signals 318 to mixed signal block 104 over mixed signal interface 106, Mixed signal block 104 then sends signals 270 to the host device over interface 102. It should be noted that the data rate of signals exchanged between host device and peripheral devices over mixed signal interface 106 is equal to the data rate of interface 102 (e.g., 1.5 Mbps, 12 Mbps, 480 Mbps.).

Referring now to FIGS. 2 and 3, when a high speed peripheral device is disconnected from an interface 380 of downstream port 306, the high speed disconnect detector 223 detects a change of the differential voltage across the mixed signal block of the downstream port 306. High speed disconnect detector 223 then sends a signal 320 over interface 110 to hub controller 302 that informs the hub controller that the peripheral device is disconnected from the downstream port 306.

Figure 4:
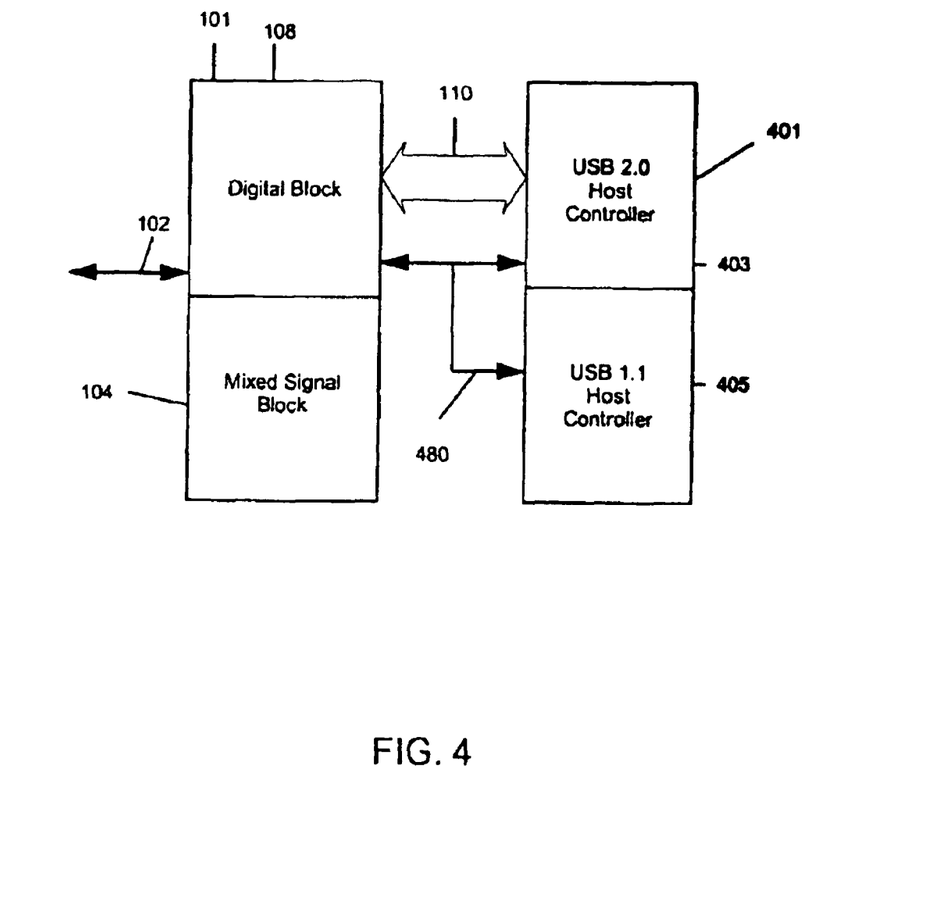
FIG. 4 is a functional block diagram of one example of the macrocell of FIG. 1 being employed in a host device.

Referring now to FIG. 4, a description of a host implementation is now provided. In the host implementation, a host comprises macrocell 101 and host controller 401. Macrocell 101 is interfaced to host controller 401, through interface 480, which in one example is an extended UTMI interface, and interface 110. in one example interface 480 comprises the USB 1.1 transceiver signals and a port_owner signal. In one example interface 480 serves to bring out the USB 1.1 transceiver signals of macrocell 101 to the UTMI level. Macrocell can be interfaced through interface 102 to a peripheral device.

Host controller 401 in one example comprises a USB 2.0 host controller 403 and a USB 1.1 host controller 405. The USB 2.0 host controller 403 is interfaced to macrocell 101 through interface 110. The USB 1.1 host controller 405 is interfaced to macrocell 101 through interface 480.

In high speed operational mode, signals 407 are exchanged between macrocell 101 and USB 2.0 host controller 403 over interface 110. In full speed and low speed operational mode, signals 409 are exchanged between macrocell and USB 1.1 host controller 405 over interface 480.

Referring now to FIGS. 2 and 4, similar to the hub implementation, when a high speed peripheral device is disconnected from interface 102, the high speed disconnect detector 223 detects a change of differential voltage across the interface 102. High speed disconnect detector 223 then sends a signal over interface 110 to USB 2.0 host controller 403 that informs host controller 403 that the peripheral device is disconnected from interface 102.

Referring now to FIG. 4, in one example, the host implementation provides the control signal port_owner to the host controller 401. Port_owner informs the USB 1.1 host controller 405 whether a full speed operational mode only or low speed operational mode only device is connected to interface 102. When full speed or low speed devices are connected to interface 102 USB 2.0 controller grants permission through port_owner for the particular device to operate on interface 480. Port owner also informs the macrocell that full speed and low speed components of macrocell 101 will be controlled by interface 480. In one example, port_owner employs 1.1 transceiver multiplexer 288 to control interface 480.

Figure 5:
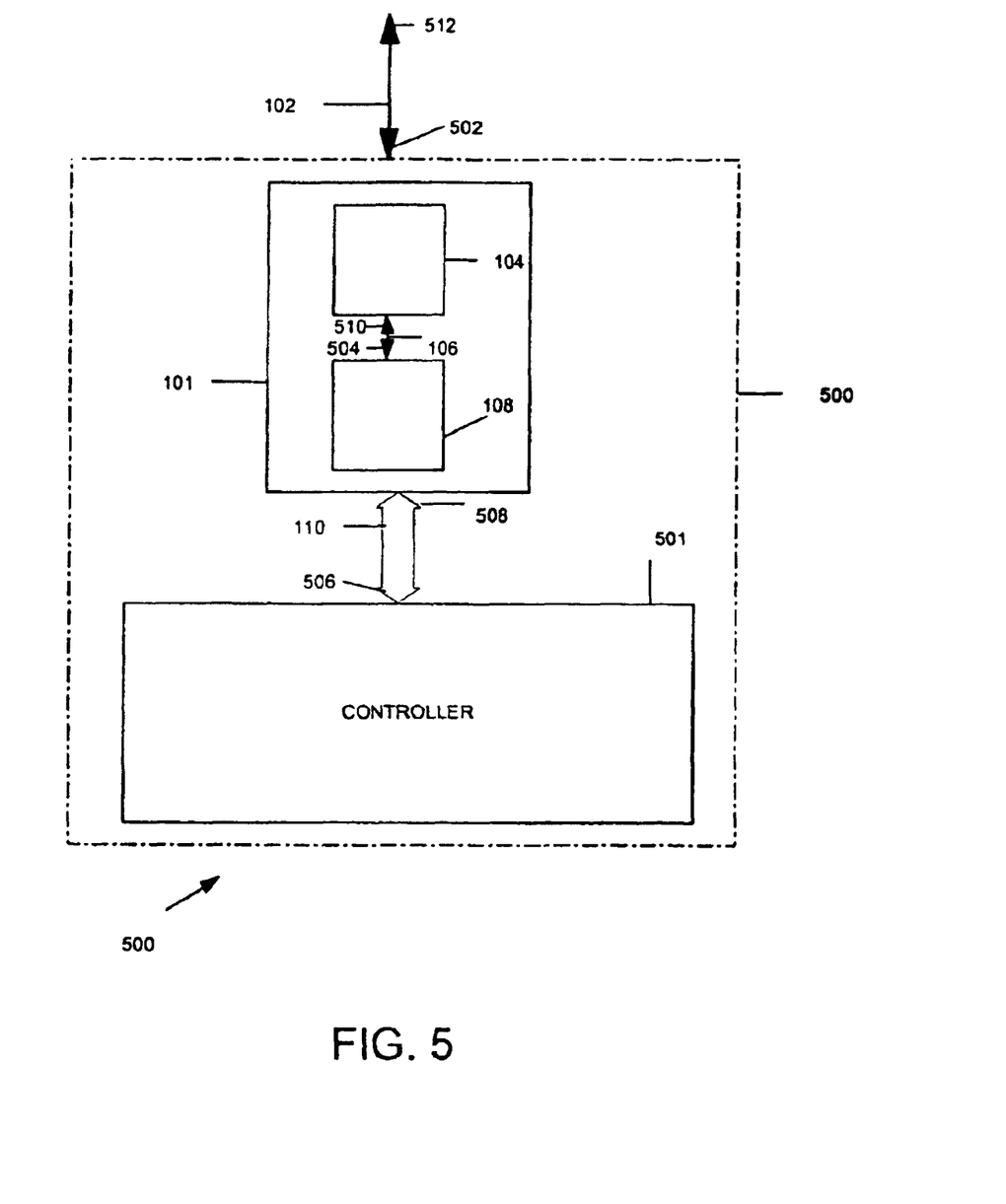
FIG. 5 is a functional block diagram of the transceiver macrocell of FIG. 1 being employed in a peripheral device.

Referring now to FIG. 5, a device implementation is now provided. In the peripheral implementation, peripheral device 500 comprises macrocell 101 and device controller 501.

Signals 502 are transmitted to peripheral device through interface 102 by a host device. Peripheral device receives signals 502 over interface 102. Mixed signal block 104 processes the signals 502 as described above with respect to FIG. 2 and sends the signals 504 to digital block 108 over mixed signal interface 112. Digital block 108 processes signals 504 as described above and transmits signals 506 to device controller 501. Device controller 501 then causes peripheral to perform an operation (e.g., printing, scanning, storing data, etc.). Device controller 501 then sends response signals 508 to host. Digital block 108 receives signals 508 and processes signals 508 as described above. Digital block 108 upon completion of processing, sends signals 510 to mixed signal block 104 over mixed signal interface 106. In response to receipt of signals 510, mixed signal block 104 processes signals 510 and transmits signals 512 to a host device over interface 102.

Figure 6:
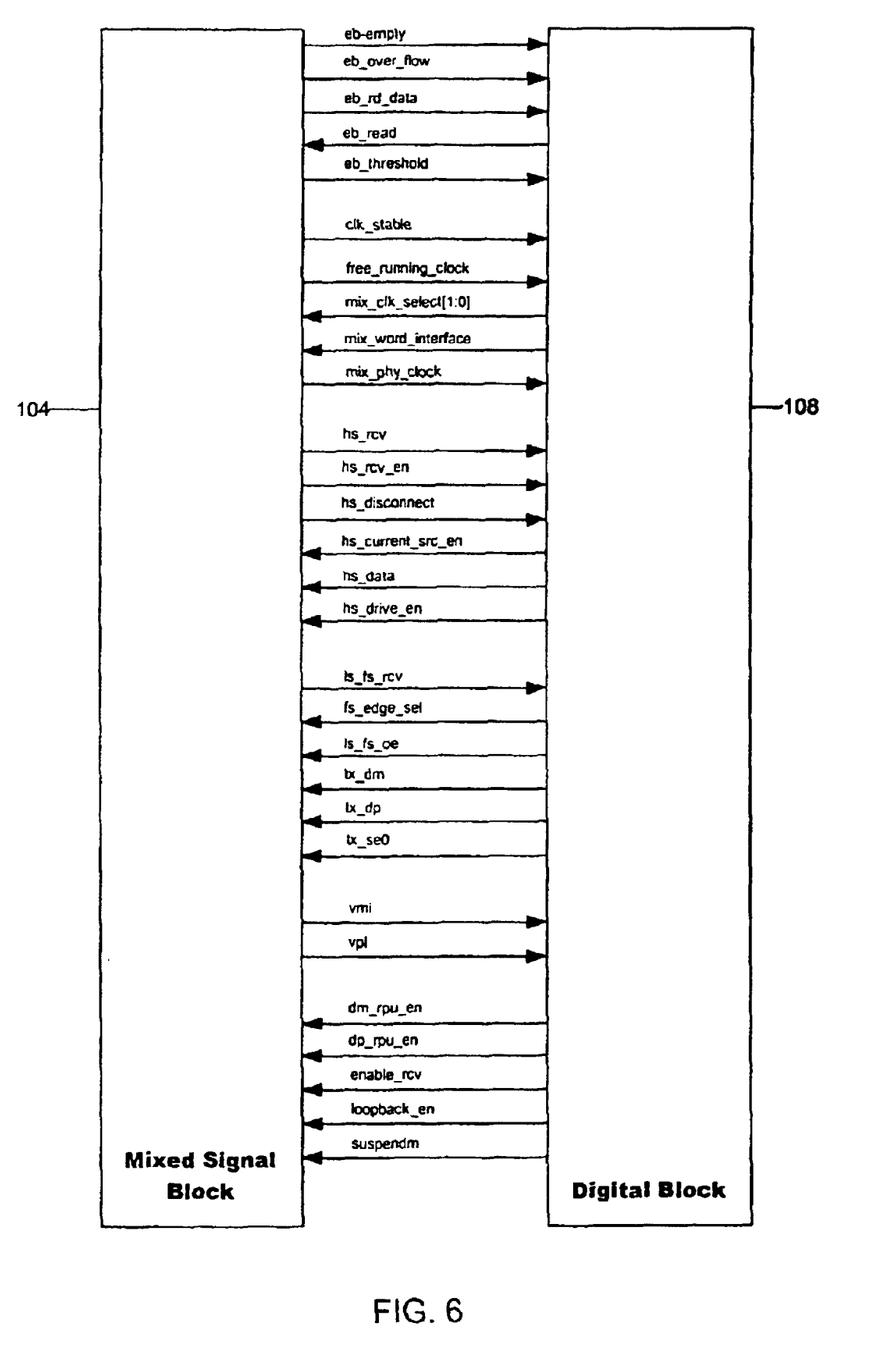
FIG. 6 is an exemplary signal diagram of one example of the mixed signal interface of FIG. 2.

A diagram of one example of the signals that are used in mixed signal interface 106 is provided in FIG. 6.

Referring to FIG. 6, the signals of mixed signal interface 106 are as follows:

| Signal Name | Direction | Active Level | Description |
| --- | --- | --- | --- |
| dm_rpu_en | Output | High | Pull-up resistor Enable at dm Line<br>1: Enable DATA − pull-up resistor<br>0: Disable Data − pull-up resistor<br>The pull-up resistor electrically indicates signaling speed capability. |
| dp_rpu_en | Output | High | Pull-up Resistor Enable at dp Line<br>1: Enable Data + pull-up resistor<br>0: Disable Data + pull-up resistor<br>The pull up resistor electrically indicates signaling speed capability. |
| enable_rcv | Output | High | Enable differential receivers.<br>Activates the differential receivers of the mixed-signal block. Does not control the single-ended receivers. |
| loopback_en | Output | High | Loopback Test Enabled. This signal is an additional signal that is not required by UTMI specification.<br>0: During data transmission Receive logic disabled.<br>1: During data transmission Receive logic enabled. This is a signal should be used along with hs_drive_en signal. When loopback_en is asserted, the receive logic should be enabled even when hs_drive_en is asserted. When loopback_en is not asserted then receive logic should not be enabled when hs_drive_en is asserted. |
| suspendm | Output | Low | Suspend. Places the PHY in a mode that draws minimal power from supplies. Shuts down all blocks not necessary for Suspend/Resume operation. While suspended, term_select must always be in FS mode to ensure that the 1.5 K pull-up on DP remains powered.<br>0: PHY circuitry drawing suspend current.<br>1: PHY circuitry drawing normal current. |
| hs_rcv | Input | N.A. | High-Speed Receive Data. This is differential output of dp and dm. It is valid only when hs_rcv_en is asserted. Note: Currently unused by the Digital Block. |
| hs_rcv_en | Input | High | High-Speed Receive Enable. Indicates the validity of hs_rcv. The signal is the output of the envelope detector, which indicates when the amplitude of the differential signal at a receiver's inputs falls below the Squelch threshold. The signal must indicate squelch within 4 bit times of when the line voltage drops below 100 mV differential amplitude, and it must indicate that the line is not in the squelch state within 4 bit times of when the signal exceeds 150 mV differential amplitude. This envelope detector must incorporate a filtering |

-continued

| Signal Name | Direction | Active Level | Description |
|---|---|---|---|
| | | | mechanism that prevents indication of squelch during the longest differential data transitions allowed by the receiver eye pattern specification. |
| hs_disconnect | Input | High | High-Speed Disconnect Detect. Indicates whether disconnection is detected in HS mode during transmission of last byte of SOF EOP. This signal is valid only in HS mode. This signal is updated only during transmission of last byte of SOF EOP. IN all other modes it is driven to low.<br>1: HS disconnection detected.<br>0: HS disconnection not detected.<br>This signal is implementation-specific and can be used in hub or host implementations. This signal is not part of the UTMI specification. |
| hs_current_src_en | Output | High | High Speed Current Source Enable. This signal enables HS current source to the required accuracy of 17.78 ma. |
| hs_data | Output | N.A. | High Speed Data. This signal determines which line is driven with the HS current source.<br>1: dp line is driven by the current source.<br>0: dm line is driven by the current source. |
| hs_drive_en | Output | High | High-Speed Drive Enable. This signal directs the HS current source to the dp or dm line, based on the status of hs_data. When deasserted, the HS current source is directed to ground.<br>1: HS current source directed to dp or dm.<br>0: HS current source directed to ground. |
| ls_fs_rcv | Input | N.A. | LS/FS Received Data. This signal is a level output for USB differential input. |
| fs_edge_sel | Output | N.A. | Rise and Fall Time Selection. This signal determines the rise and fall times of J and K signaling.<br>1: FS signaling<br>0: LS signaling. |
| ls_fs_oe | Output | High | LS/FS Transmitter Enable. When asserted, this signal enables the drivers to drive dp and dm lines with J, K, or SE0 signals, based on the status of tx_dp, tx_dm, and tx_se0.<br>1: Drives J or K or SE0 signaling on dp and dm.<br>0: Disables the drivers driving dp and dm. |
| tx_dp<br>tx_dm | Output | N.A. | Inputs to FS/LS Differential Driver. These two signals combined define the state of the dp and dm lines. When ls_fs_oe is asserted, the dp line is controlled by tx_dp and the dm line is controlled by tx_dm.<br>tx_dp  tx_dm  State of dp and dm<br>0      0      SE0 state<br>0      1      K state<br>1      0      J state<br>1      1      Not allowed. |
| tx_se0 | Output | High | FS/LS Transmit SE0. When asserted with ls_fs_oe, the FS/LS driver should drive SE0 and the dp and dm lines, independent of tx_dp and tx_dm.<br>1: dp and dm lines driven to SE0 state independent of tx_dp and tx_dm.<br>0: State of dp and dm lines is based on the status of tx_dp and tx_dm. |
| vmi | Input | N.A. | Gated version of dm line. |
| vpi | Input | N.A. | Gated version of dp line. |
| clk_stable | Input | High | Clock Stable. This output indicates that phy_clock is within specification. This signal should be asserted and the first transition of phy_clock should occur no later than 5.6 ms after the negation of the suspendm signal. And at that time phy_clock error frequency must be less than 10% (+/−6.00 MHz). The phy_clock must fully meet the required accuracy of +/− 500 ppm no later than 1.4 ms after the first transition of phy_clock.<br>0: free_running_clock not stable.<br>1: free_running_clock stable and in compliance |

-continued

| Signal Name | Direction | Active Level | Description |
|---|---|---|---|
| | | | with USB 2.0 specification After Power-on Reset or USB Reset, the USB specification allows 10 ms for reset recovery. So clk_stable should be asserted no later than 10 ms after reset is negated. |
| free_running_clock | Input | Positive Edge | Free-running HS clock. The operating frequency depends on clk_select. clk_select free_running_clock 2'b00: 480 MHz 2'b01: 48 MHz 2'b10: 48 MHz 2'b11: 6 MHz. |
| mix_clk_select[1:0] | Output | N.A. | Clock Select. This selects the operating speed mode. 2'b00: High-speed clock in HS/FS mode. 2'b01: Full-speed clock in HS/FS mode. 2'b11: Full-speed clock in FS only mode. 2'b10: Low-speed clock on LS only mode. Based on this signal, the frequency of free_running_clock is determined. This signal is also used along with the word_interface signal to determine the value of the phy_clock signal. In the digital block, this signal is connected to mix_term_select. |
| mix_word_interface | Output | N.A. | Word interface Indicator. This indicates the value of the parallel interface clock and the width of the parallel interface when mix_clk_select[1] = 1'b0. Inside the HS DLL, this signal is called word_interface, which might easily be confused with the UTMI signal of the same name. 0: phy_clock: 60 MHz, (8-bit interface) 1: phy_clock: 30 MHz, (16-bit interface) When mix_clk_select[1] = 1'b1 the value of mix_word interface can be ignored because the 8-bit interface is always used in this case. |
| mix_phy_clock | Input | Positive Edge | PHY Clock for AMSI. This clock is used for clocking receive and transmit parallel data. 60 MHz HS/FS or HS Only with 8-bit interface. 30 MHz HS/FS or HS Only with 16 bit interface. 48 MHz FS Only with 8-bit interface 6 MHz LS Only with 8-bit interface. |
| eb_empty | Input | High | Elasticity Buffer Empty. When high, this signal indicates that the elasticity buffer has no data to read. It is synchronous to free_running_clock. |
| eb_over_flow | Input | High | Elasticity Buffer Overflow. This signal is synchronous to free_running_clock. |
| eb_rd_data | Input | N.A. | Elasticity Buffer Data. The source of high-speed data sent to the Digital Block. This signal is synchronous to free_running_clock. |
| eb_read | Output | High | Elasticity Buffer Read Completed. This signal is synchronous to free_running_clock. |
| eb_threshold | Input | High | Elasticity Buffer Threshold Reached. Indicates that Elasticity Buffer is half full and that the Digital Block can start reading data. This signal is synchronous to free_running_clock. |

The signal buffering for the above signals is as follows:

| | | | |
|---|---|---|---|
| dp_rpu_en | Output | High | Registered output. |
| dm_rpu_en | Output | High | Registered output. |
| enable_rcv | Output | High | Registered input. Double flopped. |
| loopback_en | Output | High | Registered output. |
| suspendm | Output | Low | Registered output. |
| hs_rev | Input | N.A. | Input from the Analog Signal Block. High-speed receive data. It is double flopped inside the Digital Block. |
| hs_rev_en | Input | High | Input from the Analog Signal Block. It is double flopped inside the Digital Block. |
| hs_disconnect | Input | High | Registered output. |
| hs_current_src_en | Output | High | Registered output |
| hs_data | Output | N.A. | Registered output. |
| hs_drive_en | Output | High | Registered output. |
| ls_fs_rcv | Input | N.A. | Input from the Analog |

-continued

| | | | |
|---|---|---|---|
| fs_edge_sel | Output | N.A. | Registered output. |
| ls_fs_oe | Output | High | Registered output. |
| tx_dp tx_dm | Output | N.A. | Registered output. |
| tx_se0 | Output | High | Registered output. |
| vmi | Input | N.A. | Input from the Analog Signal Block. It is double flopped inside the Digital Block. |
| vpi | Input | N.A. | Input from the Analog Signal Block. It is double flopped inside the digital block. |
| clk_stable | Input | High | Registered output from the analog block. |
| free_running_clock | Input | Positive Edge | Clock. |
| mix_clk_select[1:0] | Output | N.A. | Registered output. |
| mix_phy_clock | Input | Positive Edge | Clock |
| mix_word_interface | Output | N.A. | Registered output. |
| eb_empty | Input | High | Registered output from the analog block. |
| eb_over_flow | Input | High | Registered output form the analog block. |
| eb_rd_data | Input | N.A. | Registered with one gate level of delay. One gate level of delay is present between the registered value and the AMSI values of eb_rd_data. The delay is caused by a multiplexer. |
| eb_read | Output | High | Registered with one gate level of delay. One gate level of delay is present between the registered value and the AMSI value of eb_read. The delay is caused by an AND gate. |
| eb_threshold | Input | High | Registered output form the analog block. |

It should be noted that macrocell 101 also supports full speed only and low speed only implementation. Full speed only and low speed only implementations are supported through the extension of the UTMI signal term_select to term_select[1:0] to support full speed only and low speed only implementation. term_select[0] is the same as term_select of the USB 2.0 UTMI specification. Term_select[1:0] is also known as clk_select[1:0]. Term_select[1:0] values are as follows:

| clk_select[1:0]/ term_select[1:0] | word_interface = 1'b0 | word_interface = 1'b1 |
|---|---|---|
| 2'b00 HS mode | 60 MHz | 30 MHz |
| 2'b01 HS device in FS mode | 60 MHz | 30 MHz |
| 2'b11 FS only mode | 48 MHz | 48 MHz |
| 2'b10 LS only mode | 6 MHz | 6 MHz |

In addition, macrocell 101 also contains two additional signals, dp_pullup_res, dm_pullup_res, where external pull-up or pull-down resistors are connected. To support a full speed/high speed, the pull-up resistor should be connected to dp_pullup_res. To support LS device the pull-up resistor should be connected to dm_pullup_res. In the above implementations, the other end of the pull-up resistor is connected to supply. In host/hub implementations for macrocell to support full speed and low speed operation the user should connect pull-down resistors to dp_pullup_res, dm_pullup_res with the other end of the pull-down resistors connected to ground. Although examples of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of connecting a Universal Transceiver Macrocell Interface (UTMI) macrocell to a plurality of peripheral devices, the UTMI macrocell including a mixed signal block and a digital block, the mixed signal block including a Universal Serial Bus (USB) interface, and the digital block including a UTMI interface, the method comprising:
providing a mixed signal interface to connect the mixed signal block and the digital block;
providing a first connection to the peripheral devices via a hub controller connected to the UTMI interface; and
providing a second connection to the peripheral devices via a hub repeater connected to the mixed signal interface, wherein the second connection bypasses the hub controller.

2. A hub system for providing connection to a plurality of peripheral devices, the hub system comprising:
a Universal Transceiver Macrocell Interface (UTMI) macrocell including:
a mixed signal block including a Universal Serial Bus (USE) interface;
a digital block including a UTMI interface; and
a mixed signal interface connecting the mixed signal block and the digital block;
a hub controller connected to the USB interface;
a hub device including:
a transaction translator connected to the hub controller; and
a hub repeater connected to the mixed signal interface and operatively coupled to the transaction translator; and
a plurality of ports connected to the hub repeater, wherein the plurality of ports can be coupled to the plurality of peripheral devices.

3. A method of connecting a Universal Transceiver Macrocell Interface (UTMI) macrocell to a plurality of host controllers, the UTMI macrocell including a mixed signal block and a digital block, the method comprising:
providing a mixed signal interface to connect the mixed signal block and the digital block;
providing a first UTMI connection to a first host controller used in a first speed operational mode; and
providing a second UTMI connection to a second host controller used in a second speed operational mode,
wherein the UTMI macrocell can determine whether the first host controller or the second host controller is to be used.

4. A host system for providing connection to a plurality of host controllers, the host system comprising:
a Universal Transceiver Macrocell Interface (UTMI) macrocell including:
a mixed signal block including a Universal Serial Bus (USB) interface;
a digital block including a UTMI interface; and a mixed signal interface connecting the mixed signal block and the digital block;

a first UTMI interface for connecting the UTMI macrocell to a first host controller; and a second UTMI interface for connecting the UTMI macrocell to a second host controller.

* * * * *